United States Patent
Starck et al.

(10) Patent No.: US 7,836,684 B2
(45) Date of Patent: Nov. 23, 2010

(54) UREA SUPPLY SYSTEM FOR A WASTE GAS CLEANING CATALYST AND HEATING INSERT SUITABLE THEREFOR

(75) Inventors: Roland Starck, Bellheim (DE); Oleg Kexel, Ettlingen (DE); Gerhard Thome, Kronau (DE); Armin Lang, Barbelroth (DE)

(73) Assignee: Eichenauer Heizelemente GmbH & Co. KG, Kandel (DE)

( * ) Notice: Subject to any disclaimer, the term of this patent is extended or adjusted under 35 U.S.C. 154(b) by 159 days.

(21) Appl. No.: 11/921,363

(22) PCT Filed: May 22, 2006

(86) PCT No.: PCT/EP2006/004822

§ 371 (c)(1),
(2), (4) Date: Nov. 30, 2007

(87) PCT Pub. No.: WO2006/131201

PCT Pub. Date: Dec. 14, 2006

(65) Prior Publication Data

US 2009/0100824 A1    Apr. 23, 2009

(30) Foreign Application Priority Data

Jun. 4, 2005  (DE) ............... 10 2005 025 724
Feb. 4, 2006  (DE) ............... 10 2006 005 141

(51) Int. Cl.
*F01N 3/00* (2006.01)
(52) U.S. Cl. ............... 60/286; 60/295; 60/301; 60/303

(58) Field of Classification Search ............ 60/286, 60/295, 301, 303
See application file for complete search history.

(56) References Cited

U.S. PATENT DOCUMENTS

| 4,684,786 | A | | 8/1987 | Mann et al. |
| 4,989,572 | A | * | 2/1991 | Giacomazzi et al. ........ 123/514 |
| 5,158,131 | A | | 10/1992 | Hurner |
| 5,533,486 | A | * | 7/1996 | Qutub ........................ 123/541 |
| 5,844,475 | A | | 12/1998 | Horie |
| 5,884,475 | A | * | 3/1999 | Hofmann et al. ............. 60/274 |

(Continued)

FOREIGN PATENT DOCUMENTS

DE    4432577 A1    3/1996

(Continued)

*Primary Examiner*—Thomas E Denion
*Assistant Examiner*—Diem Tran
(74) *Attorney, Agent, or Firm*—Walter A. Hackler

(57) ABSTRACT

The invention relates to a urea supply system for a waste gas cleaning catalyst of an internal combustion engine, comprising a urea tank for the receiving of urea solution, a connecting line that connects the urea tank with a waste gas cleaning catalyst, a pump in order to pump urea solution via the connecting line from the urea tank to the catalyst, and a heating insert for the defrosting of frozen urea solution. According to the invention it is provided that the return line is configured and arranged in such a manner that, during operation, because of the urea solution discharged from the return line there is prevented the forming of an air gap between the heating insert and the frozen urea solution. The invention relates also to a heating insert for such a urea supply system.

6 Claims, 13 Drawing Sheets

U.S. PATENT DOCUMENTS

| | | | |
|---|---|---|---|
| 5,976,475 | A | 11/1999 | Peter-Hoblyn et al. |
| 6,063,350 | A * | 5/2000 | Tarabulski et al. ........ 423/239.1 |
| 6,810,661 | B2 * | 11/2004 | Lambert et al. ................ 60/286 |
| 2002/0139438 | A1 * | 10/2002 | Lange ......................... 141/231 |
| 2003/0033799 | A1 | 2/2003 | Scheying |
| 2004/0025498 | A1 | 2/2004 | Lambert et al. |
| 2006/0236679 | A1 | 10/2006 | Meyer et al. |
| 2007/0079599 | A1 * | 4/2007 | Osaku et al. ................... 60/283 |
| 2007/0228028 | A1 | 10/2007 | Starck et al. |

FOREIGN PATENT DOCUMENTS

| | | | |
|---|---|---|---|
| DE | 19800421 | A1 | 7/1999 |
| DE | 10148880 | A1 | 8/2002 |
| DE | 10139142 | A1 | 2/2003 |
| DE | 20121116 | U1 | 5/2003 |
| DE | 10258257 | A1 * | 7/2003 |
| DE | 20219608 | U1 | 7/2003 |
| DE | 10332114 | A1 | 1/2005 |
| DE | 10341996 | A1 | 3/2005 |
| EP | 1582732 | A1 | 3/2004 |
| EP | 1505135 | A1 | 7/2004 |
| EP | 1602805 | A1 | 4/2005 |
| FR | 2595333 | | 3/1986 |
| FR | 2634090 | A1 | 7/1988 |
| WO | WO 00/21881 | A1 | 4/2000 |
| WO | WO 2005/024194 | A1 | 9/2004 |
| WO | WO 2005024194 | A1 * | 3/2005 |
| WO | WO 2005/107322 | A1 | 5/2005 |

* cited by examiner

UREA SUPPLY SYSTEM FOR A WASTE GAS CLEANING CATALYST AND HEATING INSERT SUITABLE THEREFOR

The invention relates to a urea supply system for a waste gas cleaning catalyst, usually installed as a standard feature in vehicles. Such a urea supply system comprises a urea tank for the storing of urea solution, a connection line which connects the urea tank to the catalyst, a pump which is used to pump the urea solution via the connection line from the urea tank to the catalyst, a heating insert for the defrosting of the frozen urea solution, and a return line that branches off the connection line and runs to the urea tank. Such a urea supply system is disclosed by U.S. Pat. No. 6,063,350.

A waste gas cleaning catalyst requires urea as a supply of ammonia. Since in the case of frost, urea solution can freeze, a heating insert is required to defrost the urea solution as rapidly as possible so that the urea required for the catalyst's operation is available.

Because urea solution is corrosive, all liquid-conveying components of the urea supply system must be made out of chemically stable materials or be coated with a suitable protective layer. Because suitable materials such as, e.g., high-grade steel or acid-resisting synthetic materials have, however, a relative low thermal conductance, it is not easy to defrost a urea solution at ambient temperatures of, e.g., −30° C. quickly enough to be able to supply urea to the waste gas cleaning catalyst.

The object of the present invention is to provide a cost-effective solution by which a urea supply system for a waste gas cleaning catalyst of an internal combustion engine can be quickly readied to operate at temperatures below the freezing point.

According to the invention, this object is solved by a urea supply system wherein the return line is configured and arranged in such a manner that while in operation, due to the urea solution that discharges from the return line, the forming of an air gap between the heating insert and the frozen urea to be defrosted is prevented.

Within the context of the invention it has been found that known difficulties in the defrosting of urea solution in the urea tank of a urea supply system are surprisingly not mainly due to the relatively low thermal conductance of the materials usually used for the heating insert such as, e.g., high-grade steel. Instead, the dissipation of the heat generated in the heating insert is essentially limited by the poor thermal conductance of the urea solution to be defrosted. In the case of known systems, it is possible that an air gap forms between the heating insert and frozen urea solution, whereby heat dissipation is additionally impeded. In the system according to the invention, the formation of an insulating air gap is prevented by conveying molten urea solution via the return line to the heating insert. If, during the defrosting of the frozen urea solution contained in the tank, a gap is formed between the heating insert and the surrounding frozen urea solution, this gap is filled with defrosted urea solution that is discharged from the return line. In such a manner, there is always a good thermal coupling of the heating insert with the contents of the urea tank.

Preferably, in a urea supply system according to the invention a defrosting vessel is connected to the connection line, wherein a portion of the quantity of urea storable in the system can be defrosted by means of the heating insert, said quantity sufficing for starting operation of the catalyst. It is especially beneficial to install the heating insert in the defrosting vessel and the defrosting vessel in a larger urea tank.

In such a manner, in the system according to the invention, at first only a small part of the entire quantity of urea, preferably between about 0.1 liters to 1.0 liter is defrosted. The defrosting vessel makes it possible to quickly defrost a sufficient quantity of urea solution to start operation of the waste gas cleaning catalyst since the thermal conductance of the heating insert can be used, first and foremost, for the heating of the urea solution contained in the defrosting vessel. The defrosting of the remaining urea solution, outside of the defrosting vessel, can be effectuated at a later time without detriment to the operation of the urea supply system.

Preferably, the return line branches off the connection line and runs to the defrosting vessel. By means of the return line it is possible to use the pump of the urea supply system to effectuate in the urea tank a better intermixing of already defrosted with still to be defrosted urea solution thus preventing, in particular, the formation of an insulating air gap between the heating insert and the frozen urea. In such a manner, it is possible to dissipate the heat generated by the heating insert to the frozen urea considerably more efficiently and to make available sufficient liquid urea solution for the catalyst in less time. The provision according to the invention to connect a return line to the connection line is very cost-effective since a pump is needed for the urea supply system anyway and that is used to obtain a better thermal coupling of the heating insert with the urea solution to be defrosted.

Another advantage of the urea supply system according to the invention is that for the defrosting of urea solution in the urea tank the heating power of any line or pump heaters, along which the urea solution passes in the circuit formed by the connection and the return lines, can be used in addition to the heating power of the heating insert.

Preferably, the defrosting vessel is provided with an overflow opening through which urea solution can flow from the defrosting vessel into the surrounding urea tank. In order to make the best possible use of this overflow opening, the connection line preferably has a first connection by means of which urea solution can be pumped out of the defrosting vessel and a second connection to pump urea solution from another section of the urea tank. In such a manner it is possible to convey cold urea solution to the urea tank via the return line and convey heated urea solution to the other section of the urea tank. After complete defrosting of the urea solution in the defrosting vessel, the remaining urea solution can be rapidly defrosted enabling an efficient use of the heating power of the heating insert.

The defrosting vessel can be configured as a bowl that is arranged in the urea tank, for example. Another possibility is to configure the defrosting vessel as a compartment of the urea tank or as a second separate tank. For example, the defrosting vessel can be provided by means of a partition that separates a lateral section of the urea tank from the remaining tank. In such a case it is not necessary that the partition be impervious to fluids. In principle, a fluid exchange between the defrosting vessel and the rest of the urea tank is harmless. The greater this fluid exchange, the lower concentrated is, however, the heating power of the heating insert on the urea solution in the defrosting vessel. Thus, an excessive fluid exchange between the defrosting vessel and the rest of the urea tank can impair the advantage of an especially rapid heating-up of a small amount of urea solution that, at first, suffices for the operation of the catalyst.

The advantages of the return line can be used in an especially efficient manner if a distribution element is provided at the outlet of the return line so as to distribute the urea flow discharged from the return line and to convey it distributed into the defrosting vessel. By way of example, the distribution element can be configured as a nozzle or as a plate with several openings so that the urea flow discharged from the return line is distributed as if it were by a showerhead. In such a manner, the already heated urea solution is mixed even better with the urea solution still to be defrosted, so that heat generated by the heating insert is used in an especially efficient manner to defrost frozen urea solution.

For an especially efficient intermixing of the urea flow discharged from the return line, the return line can be provided with several discharge apertures by means of which urea solution is returned in operation. By way of example, these discharge apertures can be configured as lateral openings in, e.g., the lateral area of a hose or of a pipe, so that the urea solution reaches the urea tank through the lateral openings.

It is especially beneficial to directly convey the heated up urea solution via the return line to the heating insert. Namely, from the very first beginning of the defrosting process, in the urea a cavity is formed around the heating insert that is filled with defrosted urea solution. Through the suctioning off of urea solution there is the risk that this cavity is emptied, creating thus an insulating air gap around the heating element. This risk can be counteracted by means of the return line, in particular as the return line ends in the proximity of the heating element and the intake aperture, that is to say, in this cavity. It is beneficial if the return line ends at a distance of not more than 2 centimeters from the heating element. It is also favorable if the return line ends at a distance of not more than 5 centimeters from the intake aperture of the intake pipe.

An advantageous arrangement in this connection is to provide the return line with a vent hole in order to aerate the cavity and to facilitate the drawing off of urea solution. This vent hole should be arranged in the return line above the level of the urea in the filled tank so that air can enter through said vent hole into the return line. The vent hole is preferably very small so that only an insignificant amount of urea solution can flow out through it.

A further aspect of the invention relates to a heating insert for the defrosting of a corrosive solution, which insert is especially appropriate for a urea supply system according to the invention. The heating insert according to the invention comprises a corrosion-resistant pipe to be immersed into the urea solution, a metal housing at least indirectly affixed to the pipe, at least one heating element that is arranged in the metal housing, a frame, extending outside of the metal housing, that bears an electric supply lead of the heating element, and a plastic-sheath casing that shields the frame and the metal housing.

Further details and advantages of the invention are explained by way of embodiments with reference to the attached illustrations. The therein described features can be used either individually or combined so as to create preferred embodiments of the invention. In the drawings the same reference numerals are used for the same components and those corresponding to each other. In the drawings FIG. 1 is a schematic representation of a urea supply system according to the invention for a waste gas cleaning catalyst of a vehicle;

Figure 1:
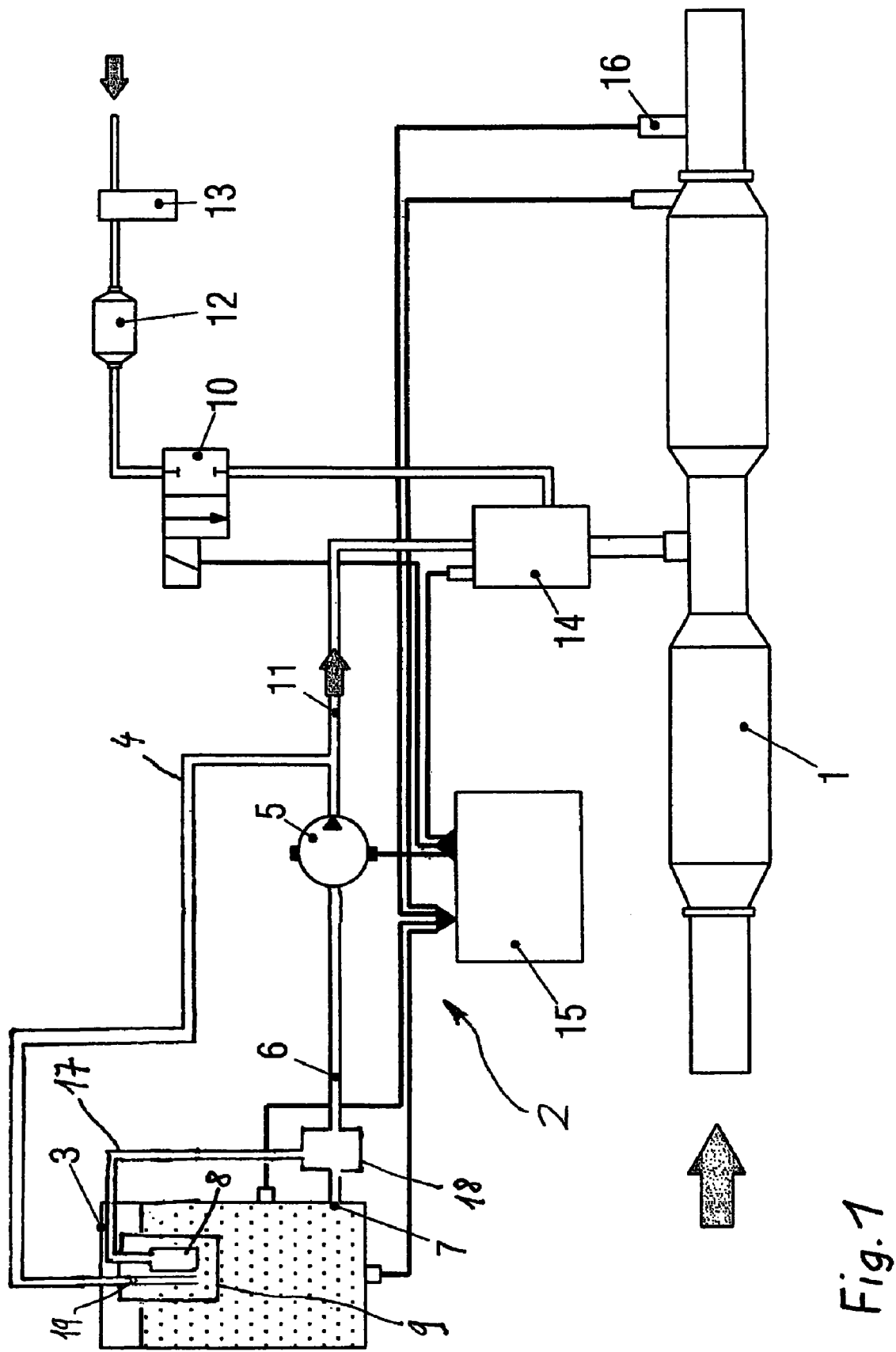

FIG. 1 shows schematically a waste gas cleaning catalyst 1 of a vehicle and a urea supply system 2 therefor. The waste gas cleaning catalyst reduces nitrogen oxides (NO, $NO_2$) to nitrogen by means of ammonia ($NH_3$). The necessary ammonia for this is obtained from urea solution that is provided by the urea supply system.

The urea supply system 2, illustrated in FIG. 1, comprises a urea tank 3 for storing of urea solution, a connection line 6, 11 that connects the urea tank 3 with the catalyst 1, a pump 5 to pump the urea solution via the connection line 6, 11 from the urea tank 3 to the catalyst 1, and a heating element 8 to heat urea solution in the urea tank 3. A return line 4 which leads in the urea tank 3 branches off from the connection line 11 so that the heated urea solution can be returned to the urea tank 3. In such a manner, a better intermixing of already defrosted urea solution with the still to be defrosted urea solution is obtained, so that a quantity of urea solution required for the operation of the waste gas cleaning catalyst 1 can be rapidly defrosted. The outlet of the return line 4 is configured and arranged in such a manner that during operation, because of the urea solution flowing out from the return line 4, the forming of an air gap between the heating element 8 and the still to be defrosted frozen urea solution is prevented.

As illustrated in FIG. 1, the return line can end close to the intake aperture of an intake pipe of the heating insert 8 or, as shown hereinafter in FIGS. 2 and 3, above the urea level in the filled tank 3. If the return line ends close to the intake aperture of an intake pipe of the heating insert 8, as illustrated in FIG. 1, in order to prevent in an especially efficient manner the forming of an air gap between the heating insert 8 and still to be defrosted urea solution by means of a concerted introducing of defrosted urea solution, it is beneficial to provide a vent hole 19 in the return line 4. The vent hole is provided in the return line above the urea level present in the filled tank, so that air can enter into the return line through the vent hole 19. The defrosting process might cause formation of a cavity in the urea around the heating insert 8. By means of the vent hole 19 it is possible to prevent negative pressure that would hinder the drawing off of the urea solution. Therefor it is beneficial if the return line 4 ends at a distance of not more then 5 centimeters from the intake aperture of the intake pipe.

The heating insert 8 is provided with a defrosting vessel 9 that is connected to the return line 4 and to the connection line 6. This defrosting vessel 9 makes it possible to use the heating power of the heating insert 8, first and foremost, for the heating up of the urea solution contained in the defrosting vessel 9. The capacity of the defrosting vessel 9 is about one liter and, as a rule, it contains at least 0.2 to 0.3 liter urea solution so that a sufficient quantity of urea for the operation of the waste gas cleaning catalyst 1 can be defrosted quite rapidly. The defrosting of the remaining urea can be effectuated at a later time without detriment to the operation of the urea supply system 2. The defrosting vessel 9 is provided with an outer wall that borders on the liquid in the urea tank. This arrangement has the advantage that after the defrosting of urea solution in the defrosting vessel, heat is given off into the urea tank 3. In this way the heating insert 8 can be used for the defrosting vessel 9 as well as for the urea tank 3.

The connection line 6 is provided with a first connection 17 by means of which urea solution can be drawn from the defrosting vessel 9, and a second connection 7 for the drawing off of urea solution from the other part of the urea tank 3. The two connections 7, 17 are brought together by a reversing valve 18. The defrosting vessel 9 has an overflow opening 29 (see FIG. 2) so that by pumping urea solution through the second connection 7, the improvement of the heat distribution, caused by the return line 4, can also be used for the defrosting of the remaining urea solution that is outside of the defrosting vessel 9.

The urea supply system 1 comprises also a control valve 10 that is connected to an air supply 12 with a compressor 13 and a dosing valve 14 by means of which urea solution and air can be fed to the catalyst 1 in dosed amounts. The pump 5, the valves 9, 10, 18, and the dosing valve 14 are controlled by a control unit 15 that is supplied by a probe 16 with data on the partial oxygen pressure in the catalyst 1 and by a temperature probe with data on the urea temperature in the urea tank 3.

Figure 2:
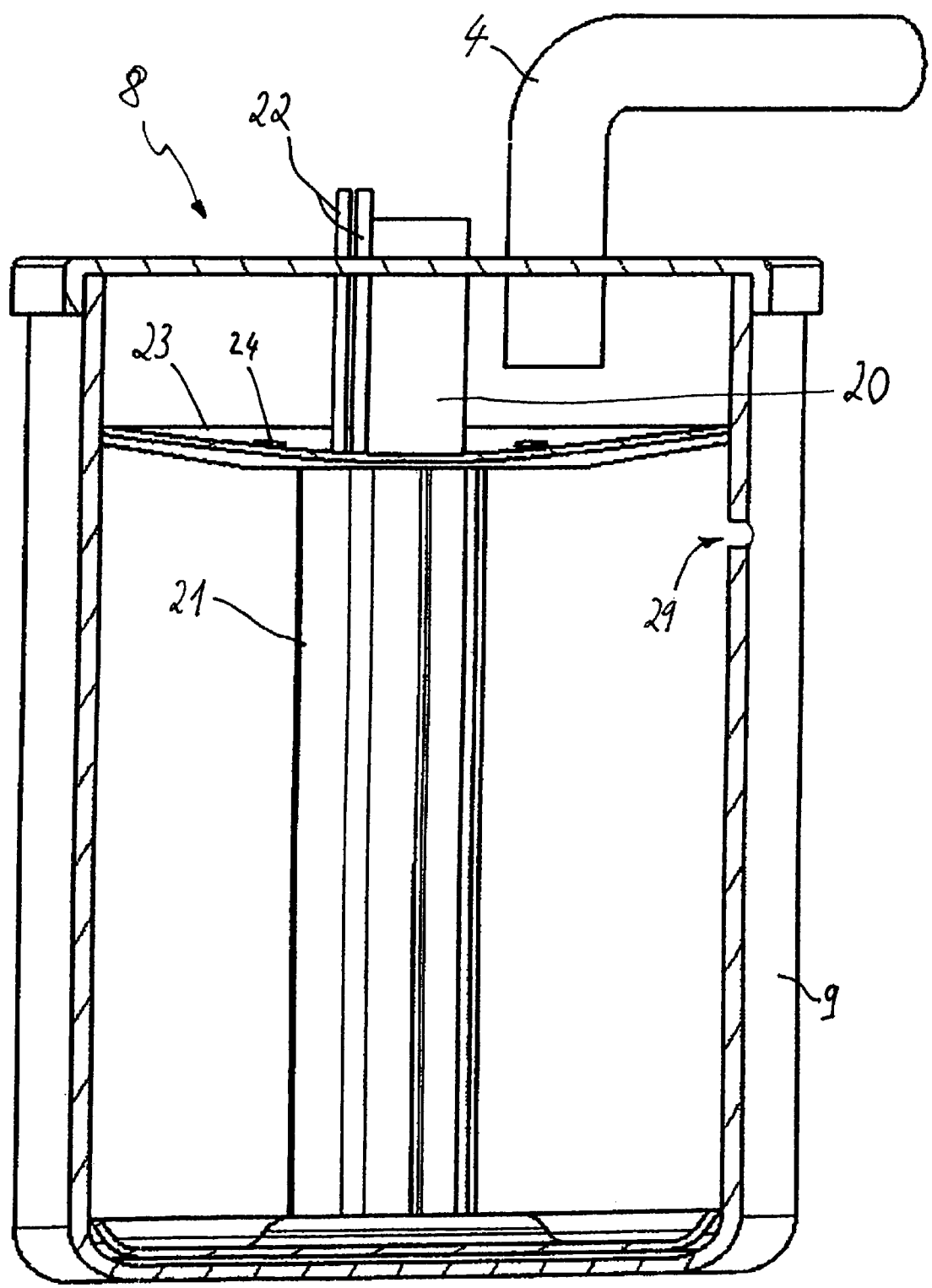
FIG. 2 is a detailed view of a heating insert according to the invention for the urea supply system shown in FIG. 1.

FIG. 2 shows an embodiment of a heating insert 8 for the urea supply system 1 illustrated in FIG. 1. The heating insert 8 comprises a corrosion-resistant pipe 20, e.g., out of a synthetic material or high-grade steel, to be immersed in the urea solution to be heated, which pipe is connected as an intake pipe to the connection line 17, 6, illustrated in FIG. 1, a metal housing (see FIG. 4) that is affixed on outside of the intake pipe 20, and at least a PTC heating element (see FIG. 4) that is arranged inside the metal housing. This metal housing is surrounded by a corrosion-resistant coating in the form of a plastic sheath—21 in order to protect it against the corrosive urea solution. This plastic sheath 21 is in the form of an injection molded casing into which the junction lines 22 of least one heating element are embedded.

The heating insert 8 also comprises the already described defrosting vessel 9 for urea solution, in which the intake pipe 20 with at least one heating element is arranged. At the intake pipe 20 is affixed a distribution element 23 that in use protrudes from the urea solution to be heated up, and has the purpose to distribute the incoming urea flow. The return line 4, from which is discharged this urea flow, is also illustrated in FIG. 2. The distribution element 23 is configured as a plate having several openings 24 that distributes the incoming fluid flow in the manner of a showerhead either in droplets or jets. It is beneficial if the distribution element 23 is slipped-on either on the return line 4 or the intake pipe 20 of the heating element 8. As an alternative, the distribution element 23 can also be affixed to the defrosting vessel 9. By way of example, the distribution element 23 can be configured as a hole-type element, as in FIG. 2, or as a baffle element either out of sheet metal or a synthetic material. As an alternative, the distribution element can be configured also as a nozzle or as a perforated hose end.

As an alternative, fluids can also be directly conveyed to the heating insert 8 to fill a possible gap between the heating insert 8 and the frozen urea solution.

An overflow opening 29 is provided in the defrosting vessel 9 below the distribution element 23 through which opening the heated urea can flow.

Figure 3:
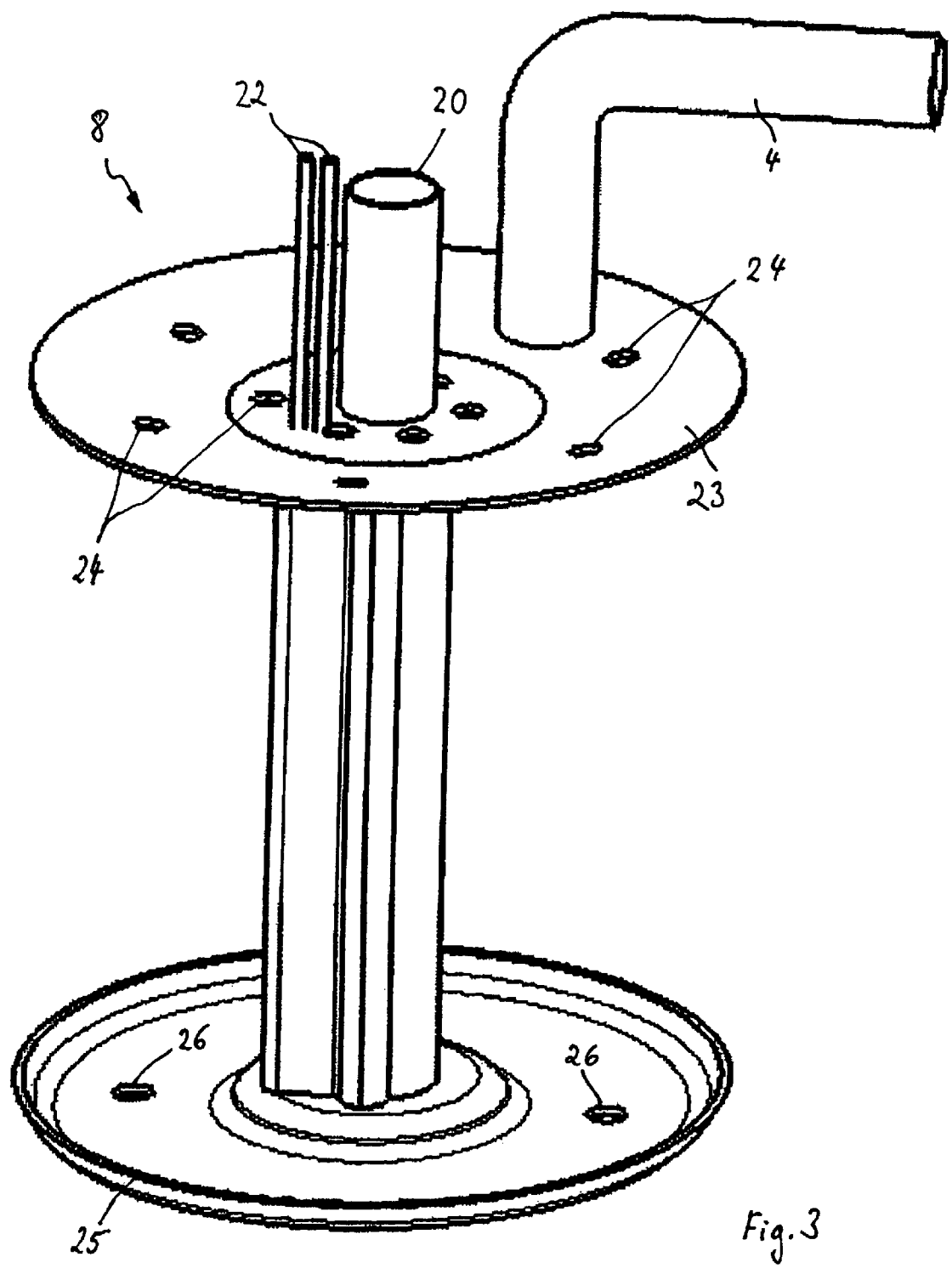
FIG. 3 is the heating insert illustrated in FIG. 2 without the defrosting vessel.

FIG. 3 shows in a diagonal view the heating insert 8, illustrated in FIG. 2, without the defrosting vessel 9 but with the return line 4. In order to convey heat as efficiently as possible from the intake pipe 20, made of high-grade steel, to the urea solution to be heated, a heat-conducting element 25 is affixed to the intake pipe 20. This heat-conducting element 25 is an essentially disk shaped sheet metal made of high-grade steel, that is attached at the bottom of the intake pipe 20. The heat-conducting element is provided with openings 26 through which urea solution can circulate. The high-grade steel used is preferably V4A steel.

Figure 4:
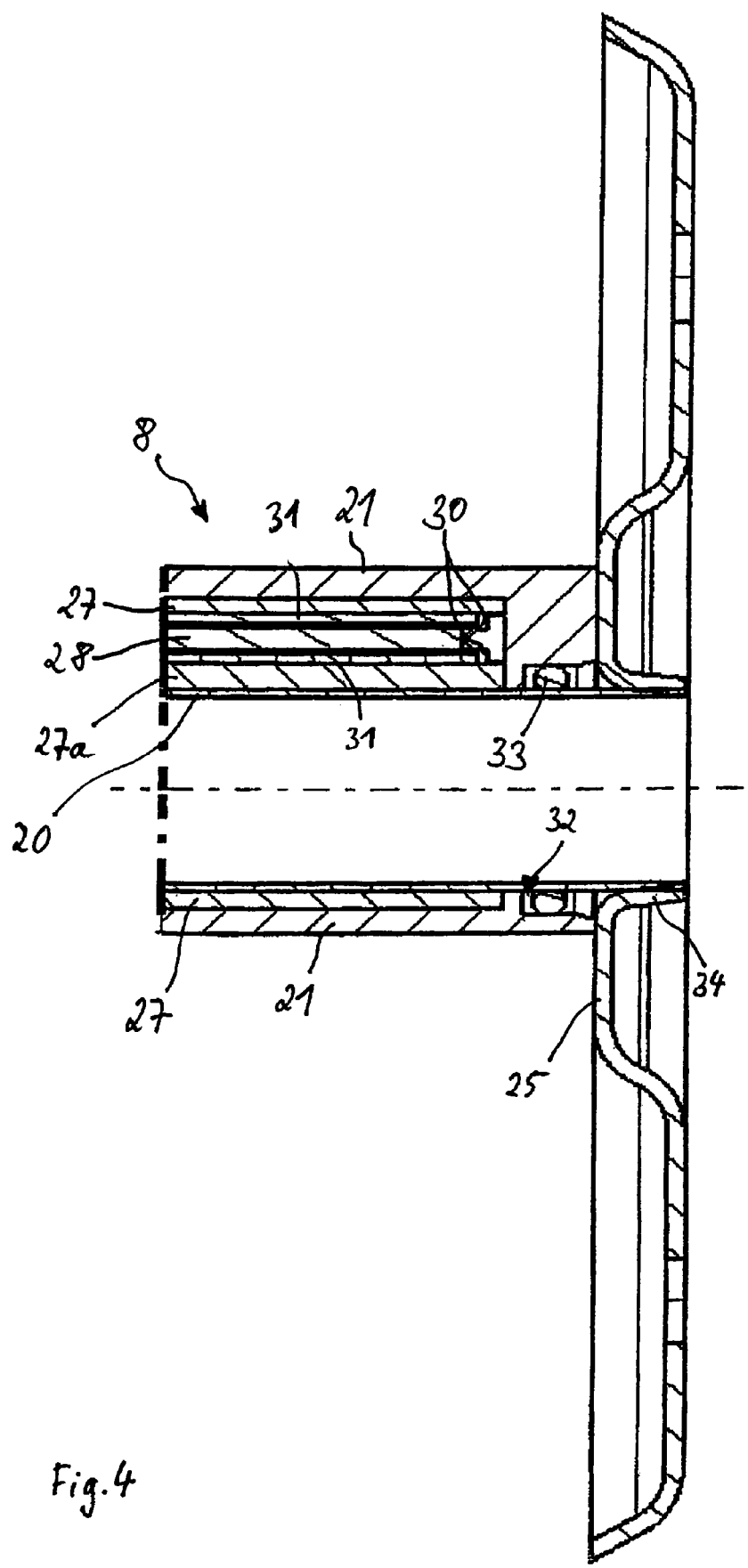
FIG. 4 is a cross-sectional view of FIG. 3.

FIG. 4 shows a cross-sectional view of the heater insert 8 illustrated in FIGS. 2 and 3. This illustration shows the metal housing 27 surrounded by the plastic sheath 21, in which disk shaped PTC heating elements 28 are mounted. PTC heating elements are also called barretters. Because of their positive temperature coefficient, they have the advantage of an inherent protection against overheating.

The metal housing 27 is an extruded special section pipe made of a good heat-conducting material, preferably an aluminum alloy, slipped on the intake pipe 20. Inside the metal housing 7, the heating elements 28 are held by an assembly frame 30. The manufacture can be considerably facilitated by using an assembly frame 30 because an easily manageable unit can be inserted into the metal housing 27. The assembly frame 30 bears connection plates 31 with an insulating layer such as, e.g., ceramic fibers. By means of the connection plates 31 the heating elements 28 can be supplied with electric power via the junction lines 22. Patent describes A suitable assembly frame 30 as well as the therein affixed components is disclosed by DE 102 58 257 A1 which is herein incorporated by reference.

After insertion of the assembly frame 30 with the components held therein (in particular, the heating elements 28 and the connection plates 31) into the metal housing 27, the latter is pressed in order to obtain the best possible thermal coupling of the heating elements 28 with the metal housing 27. Furthermore, the metal housing 27 is pressed against the intake pipe so that a good thermal coupling is also achieved with the intake pipe 20. As shown in FIG. 4, a wall 27a of the metal housing 27 is configured between the intake pipe 20 and the heating element 28. This wall 27a helps to distribute heat generated by the heating elements 28 over a large surface of the intake pipe 20. The metal housing 27 consists of a cold-hammered aluminum alloy such as, e.g., an AlMgSi alloy, in particular, an $AlMGSi_{0.5\ldots 1}$ alloy.

The metal housing 27 is tightly encased by the plastic sheath 21 and it is thus protected against the corrosive urea solution. The plastic sheath 21 is provided with a groove 32 for the O-ring 33 around the intake pipe 20. This keeps urea solution away from the metal housing 27, i.e. prevents seeping between the intake pipe 20 and the plastic sheath 21. However, the plastic sheath 21 can be made by injection molding around the metal housing 27 and the intake pipe 20, in which case an O-ring becomes unnecessary.

From FIG. 4 can also be gathered that the heat-conducting element 25 with clamping lugs 34 fits closely to the intake pipe 20 in order to obtain the best possible thermal coupling.

Figure 5:
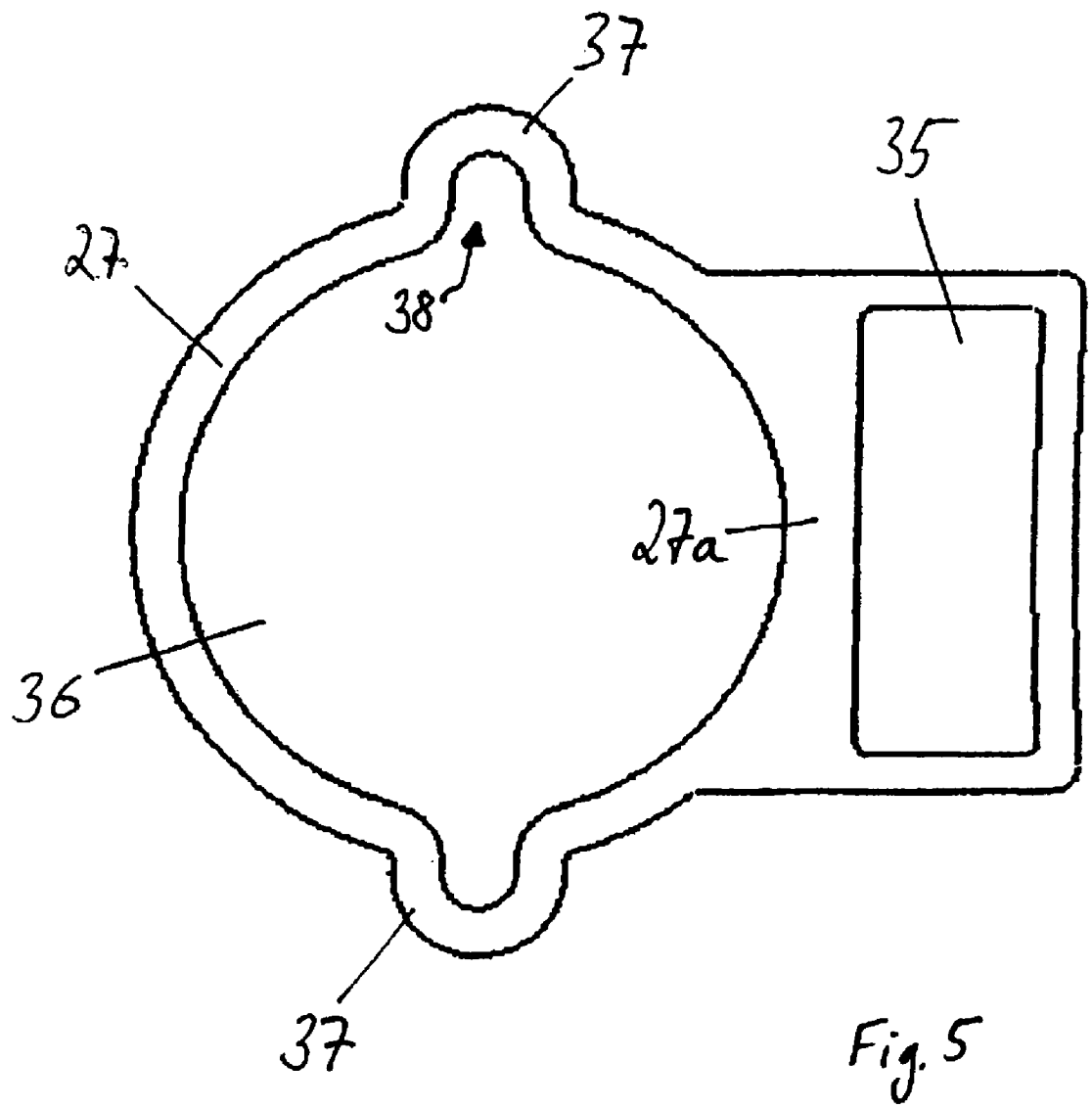
FIG. 5 is a metal housing of the illustrated heating insert in a cross-sectional view.

FIG. 5 shows in a cross-sectional view the metal housing 27 of the described heating insert 8. As mentioned earlier, the metal housing 27 is a special section pipe made out of a cold-hammered aluminum alloy. The metal housing 27 has a channel 35 for the insertion of the assembly frame 30 with the heating elements 28. During assembly, the intake pipe 20 is pushed into another channel 36 of the metal housing 27. The partition 27a runs between these two channels 35, 36 so that, via the metal housing 27, the heat generated by the heating elements 28 can be conveyed all over to the intake pipe 20.

Figure 6:
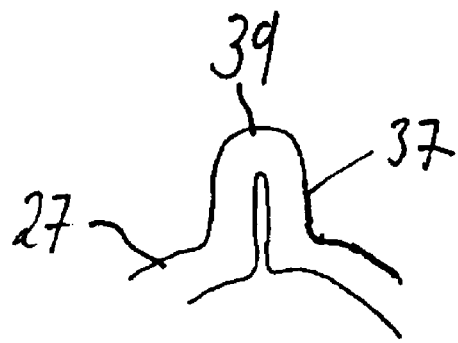
FIG. 6 is a detailed view of FIG. 5.

FIG. 5 shows the metal housing 27 before it is pressed together with the intake pipe 20. The metal housing 27 has preferably at least one bump 37 which runs in a longitudinal direction and has a U-shaped cross-section with an opening facing the channel 36. The embodiment shown has two such bumps. After sliding the metal housing 27 on to the intake pipe 20, the bumps 37 are compressed so that the channel's 36 cross-section is reduced and the metal housing 27 rests closely against the intake pipe 20. FIG. 6 shows the bumps 37 after they have been compressed. As shown in FIG. 6, the bumps 37 are turned by compressing into press folds 39.

Figure 7:
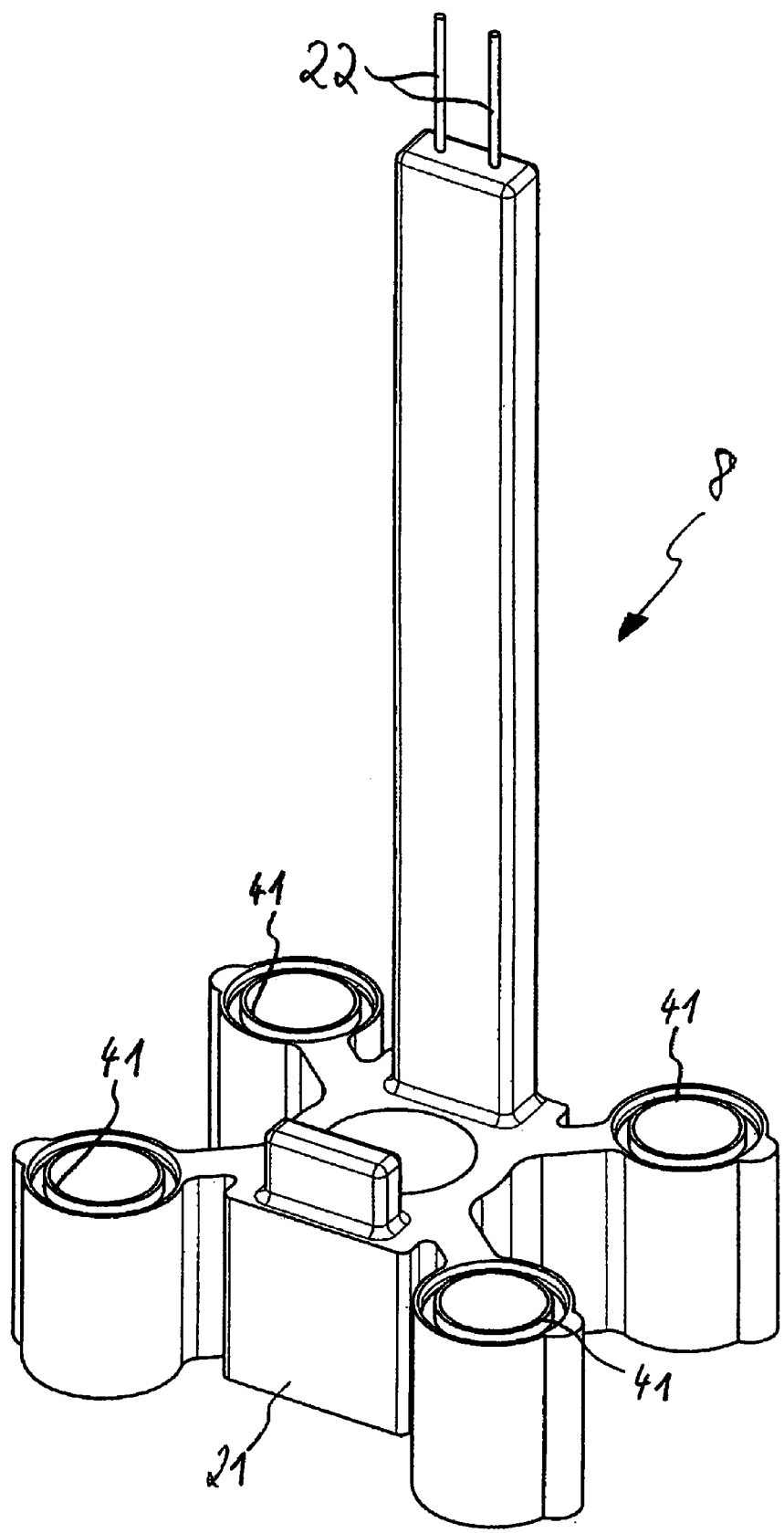
FIG. 7 is another embodiment of a heating insert according to the invention.

FIG. 7 shows another embodiment of a heating insert 8 for the urea supply system 1, illustrated in FIG. 1, without the thereto belonging defrosting vessel. The essential difference between this embodiment and the previously described embodiment is that the heating insert illustrated in FIG. 7 comprises several high-grade steel pipes 41. One of these high-grade steel pipes 41 can be connected as an intake pipe to the connection 17 of the urea supply system 2. Because of the utilization of several high-grade steel pipes 41, the heating insert 8, illustrated in FIG. 7, has an improved thermal coupling to the urea solution to be heated. The reason for this is that the thermal conductance of high-grade steel is greater than the thermal conductance of the plastic sheath 21 required for the protection of the metal housing 27. Another advantage of the illustrated heating insert 8 is that the generated heating power can be concentrated at the bottom part of a defrosting vessel. In this way, even in the case of an only partly filled defrosting vessel, the heat generated by the heating insert 8 can be fully used for the melting of urea solution.

Figure 8:
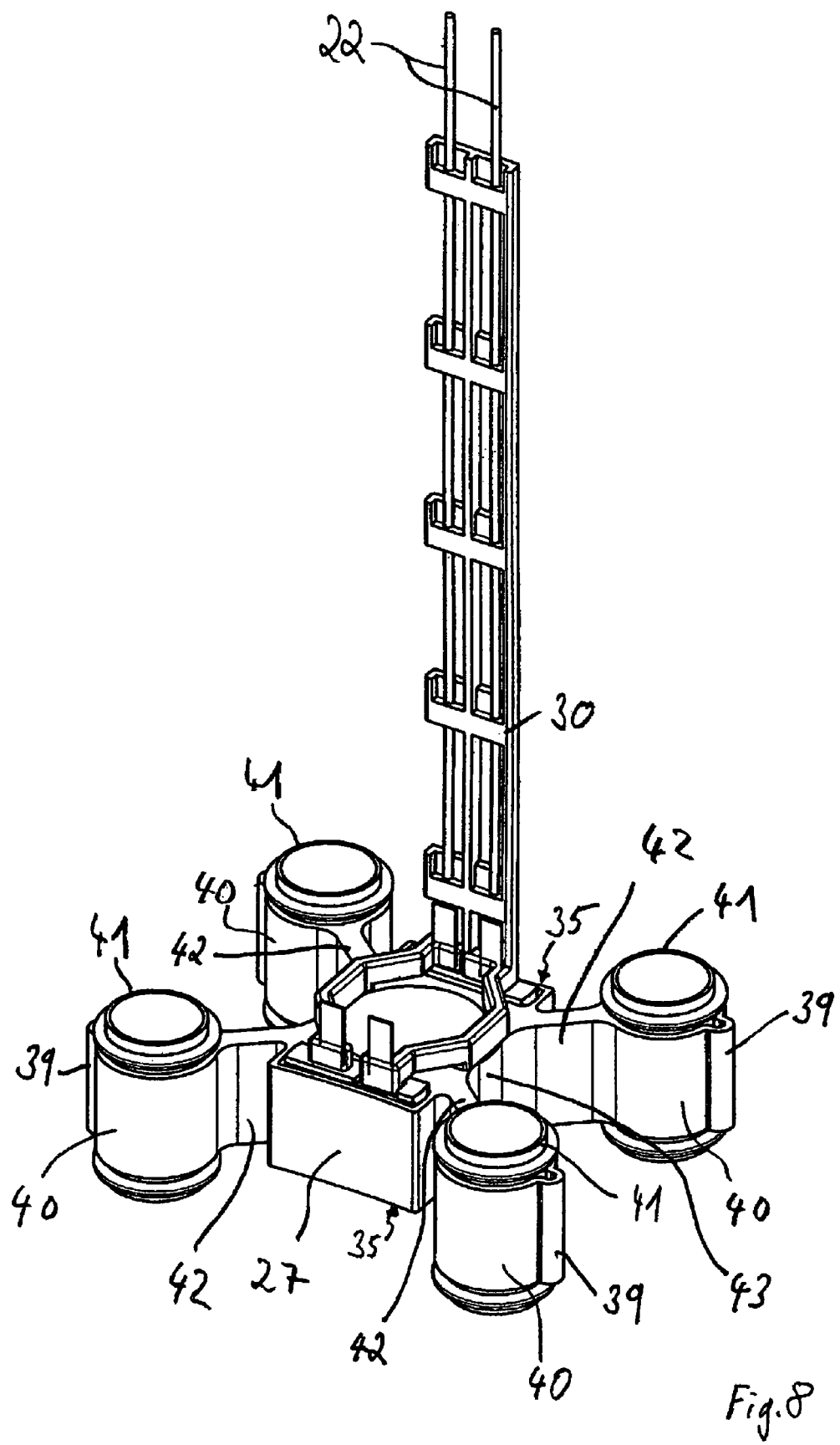
FIG. 8 is the embodiment illustrated in FIG. 7 without its plastic-sheathed casing.

FIG. 8 shows the heating insert 8, illustrated in FIG. 7, without the plastic sheath 21 by means of which the metal housing 27 and the junction lines 22 are protected against the corrosive effect of urea solution. The plastic sheath 21, illustrated in FIG. 7, can be provided in a cost-effective manner by injection molding around the metal housing 27. For best possible thermal coupling the insides of the high-grade steel pipes 41 should remain uncovered.

As in the above described embodiment, the metal housing 27 is a special section tube made of a hard, resilient aluminum alloy. The metal housing 27, illustrated in FIG. 8, is provided, however, with several (namely, two) heating channels 35 in each of which at least one heating element 28 is arranged together with a section of the assembly frame 30. The metal housing 27 has several pipe sections 40 as other channels, in each of which is arranged a high-grade steel pipe 41. The pipe sections 40 are connected by arms 42 with a central body 43 in which the heating elements are arranged. In this way, the generated heat is conveyed over a large surface to the urea solution to be melted.

Figure 9:
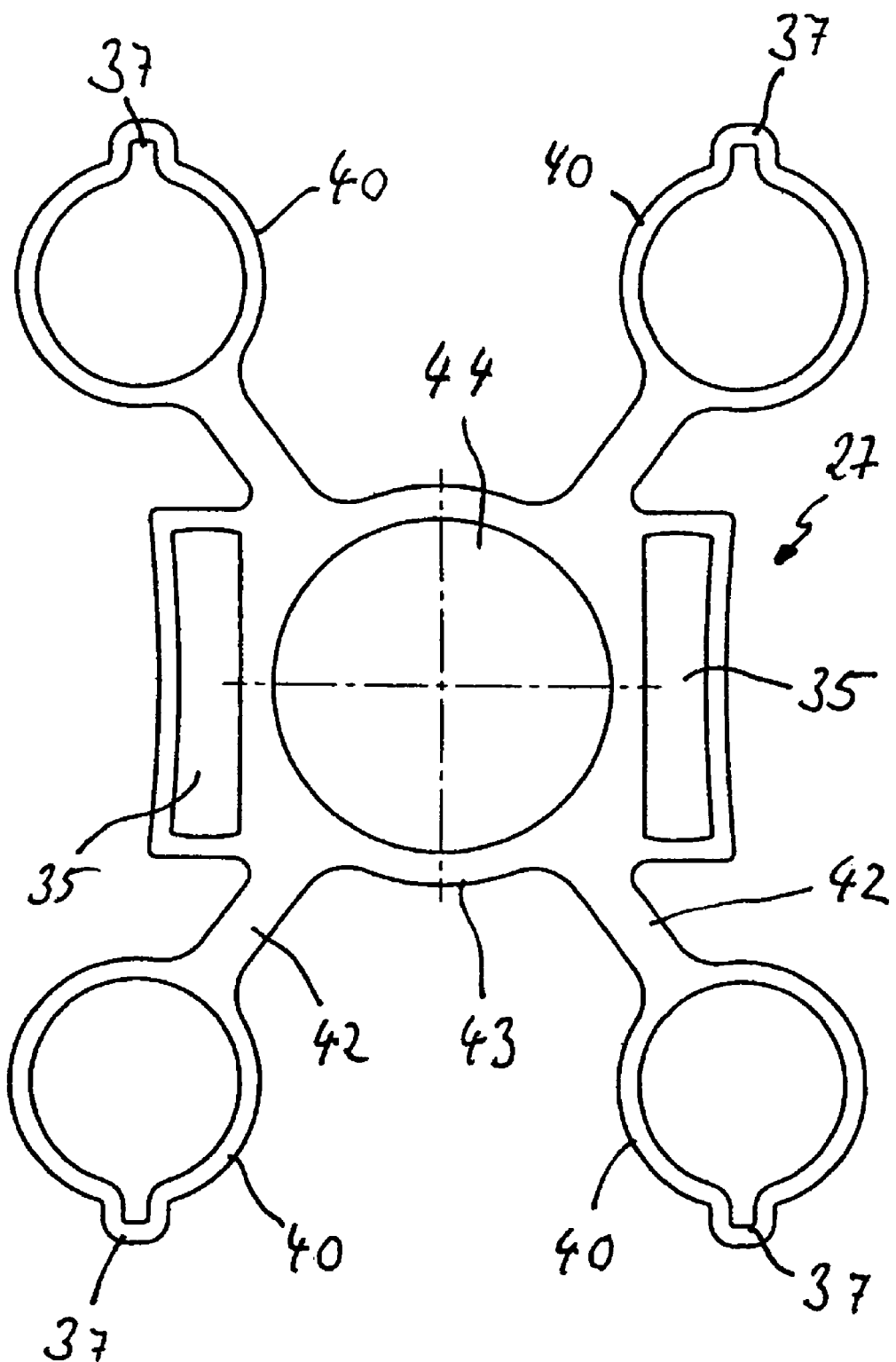
FIG. 9 is the metal housing of the heating insert illustrated in FIGS. 7 and 8 in a cross-sectional view.

FIG. 9 shows a cross-section of the metal housing 27. As it can be seen, the pipe sections 40 are provided with bumps 37 which—as described in FIGS. 5 and 6—are compressed into press folds 39 after inserting of the high-grade steel pipes 41.

As shown in FIG. 9, the central body 43 has a central channel 44 between the heating channels 35. This central channel 44 causes first and foremost that it is easier to compress the central body 43 in order to obtain best thermal coupling between the heating elements 28 and the metal housing 27. A high-grade steel pipe can also be arranged in the central channel 44. In order not to encumber the pressing operation, the central channel 44 is preferably not obstructed so that its inner surface must also be covered with the plastic sheath 21.

Figure 10:
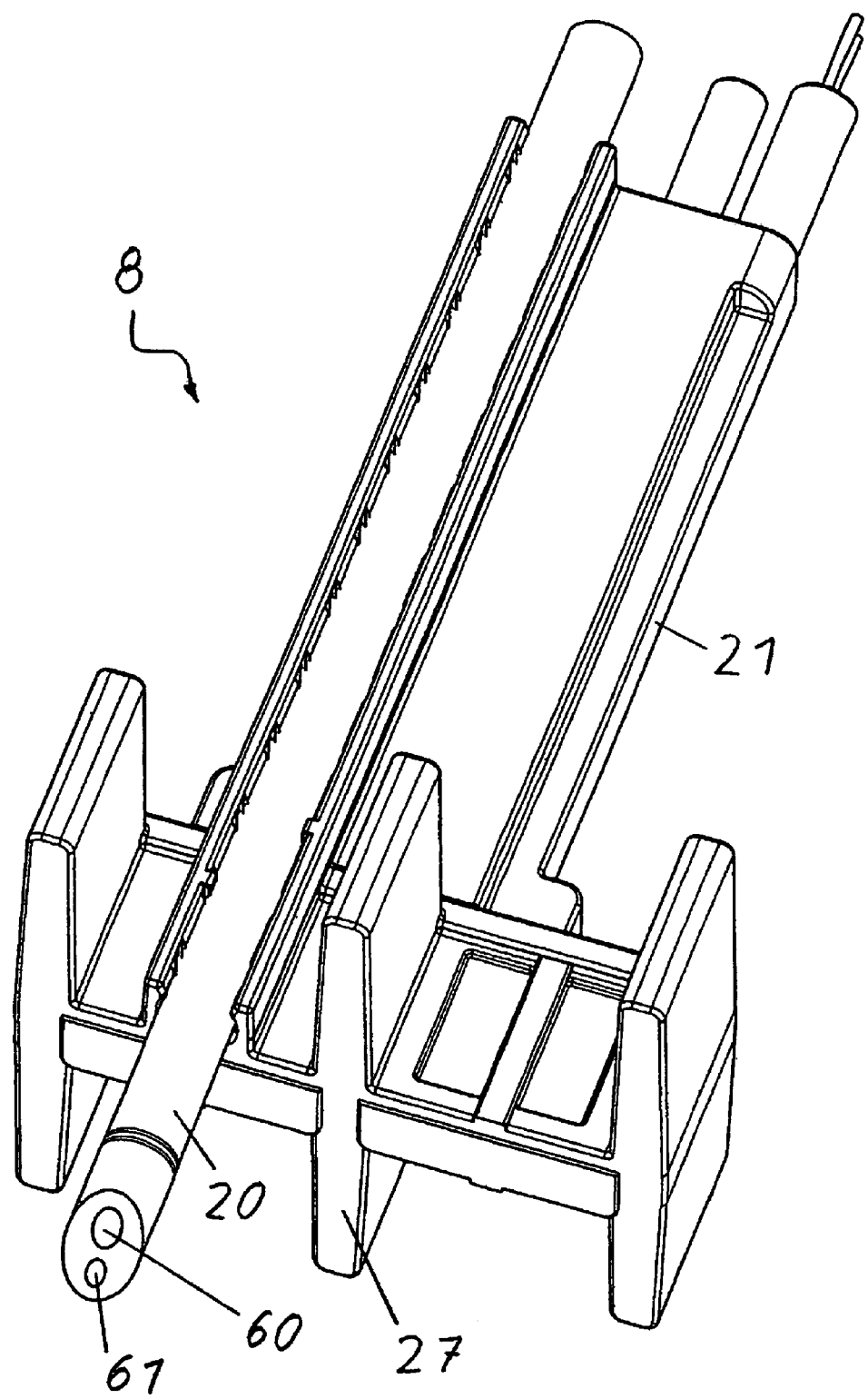
FIG. 10 is another embodiment of a heating insert according to the invention.

FIG. 10 shows another embodiment of a heating insert 8 for defrosting a corrosive solution, that is suitable for the above described urea supply system 2. The heating insert 8 comprises a corrosion-resistant pipe 20 as intake pipe to be immersed into the solution, a metal housing 27 that is affixed by a plastic sheath 21 to the intake pipe 20, two PTC heating elements arranged in the metal housing 27, a frame 30, shown in FIGS. 11 and 12, that extends outside of the metal housing 27, and holds at least one electric supply lead 50, 51 of the heating element, in the shown embodiment both supply leads 50, 51. The frame 30 and the metal housing 27 are surrounded by a plastic sheath 21.

The plastic-sheath 21 was made as an injected molded part around the frame 30 and the metal housing 27. A characteristic feature of the illustrated embodiment is that the plastic-sheath 21 is multi-layered. After assembling of the frame 30 and the metal housing 27, a first plastic layer was first sprayed on the frame 30 and the metal housing 27 in order to fix the position of the frame with respect to the metal housing 27 and the electric supply leads 50, 51 with respect to the frame 30.

The first plastic layer is preferably applied by a hot-melt-injection molding process at a relatively low pressure. In such a manner, one obtains a greater dimensional accuracy and a more reliable positioning and sealing of the entire heating insert with the power leads before the final sheathing with the second layer. The second layer is applied under a higher pressure. Preferably, for the second layer a glass fiber reinforced synthetic material, in particular a polyamide, is used. A hydrolysis-resistance modified polyamide is especially suitable.

By means of the described two-layered assembly it is possible to obtain a double sealing function and thus a higher reliability because the sealing effect of the plastic-sheath 21 is not impaired by tears in only one of the two layers of the synthetic material.

The plastic-sheath 21 is configured in such a manner that it forms a seat which holds the intake pipe 20. The seat in the illustrated embodiment is configured as a groove, in particular a Ω-shaped groove. The intake pipe 20 is a good heat-conducting, elastic plastic pipe such as, e.g., out of EPDM with a Shore hardness of 60 to 80 Shore A.

Figure 11:
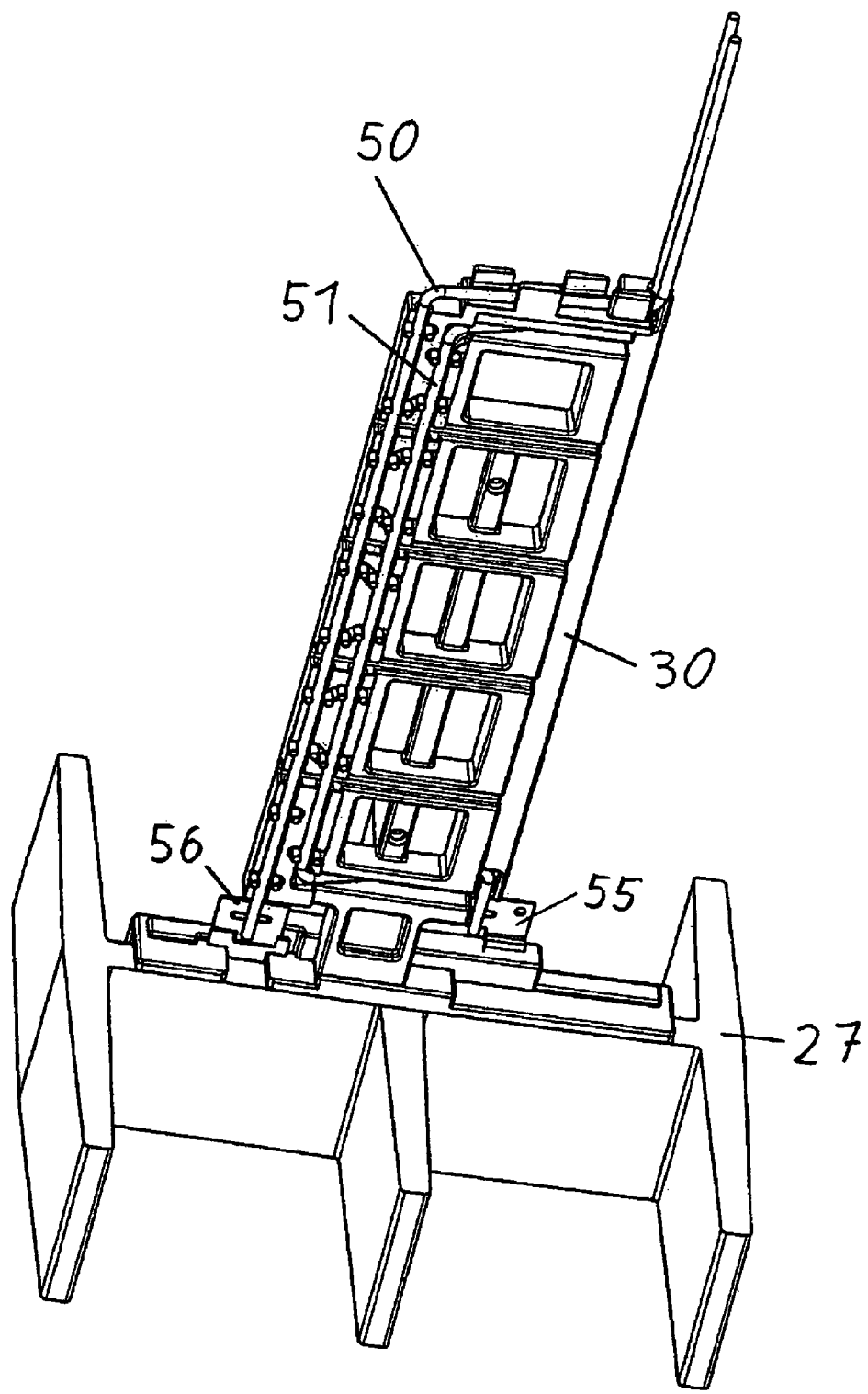
FIG. 11 is the embodiment illustrated in FIG. 10 with its plastic-sheath.
Figure 12:
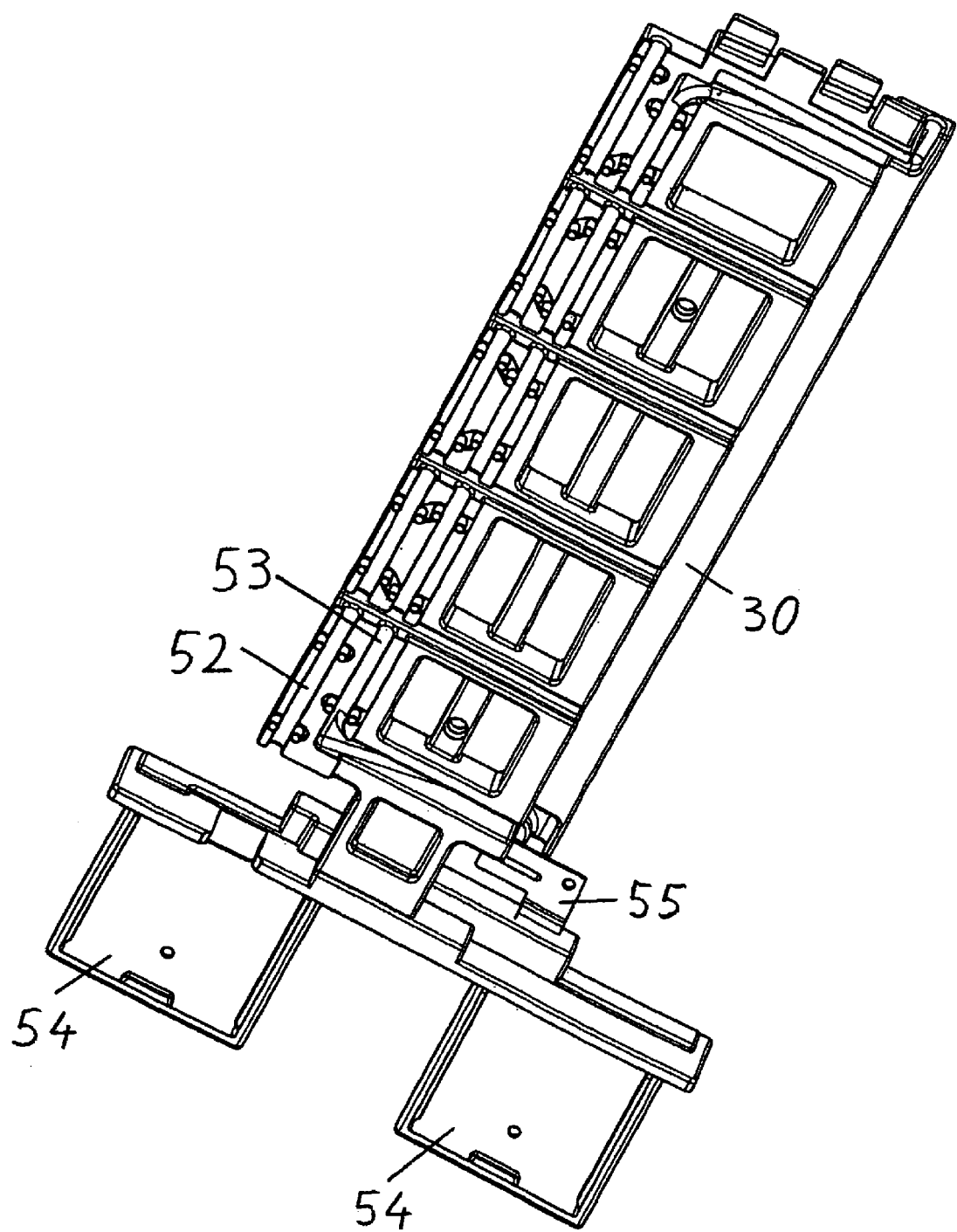
FIG. 12 is the frame of the embodiment illustrated in FIGS. 10 and 11.
Figure 13:
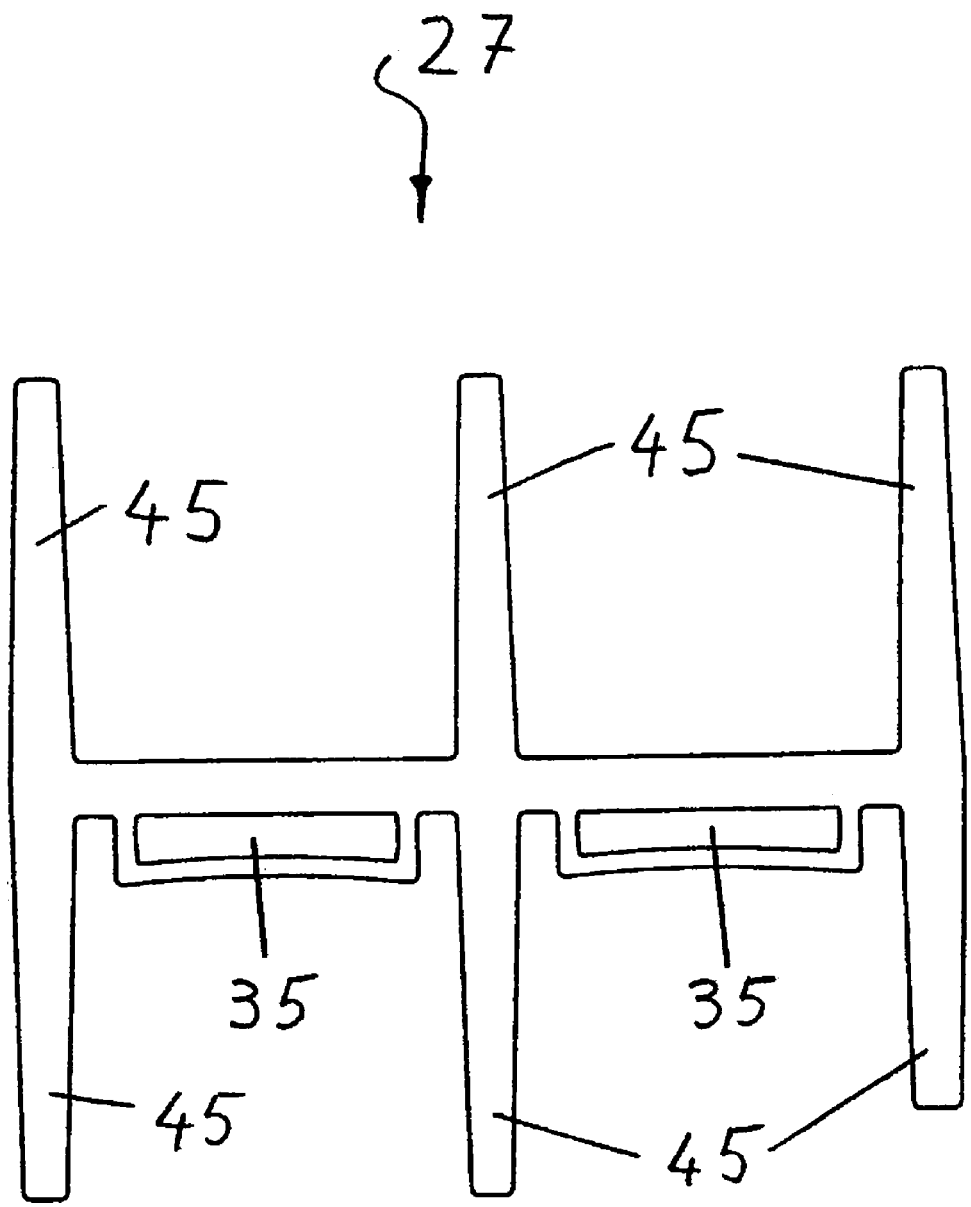
FIG. 13 is the metal housing of the heating insert illustrated in FIGS. 10 and 11 in a cross-sectional view.

The frame 30, illustrated in FIGS. 11 and 12, has a stability-increasing lattice structure and extends along the intake pipe 20. As shown in FIG. 12, the frame 30 is distinctly longer than the metal housing 27. It is beneficial if the frame 30 is at least twice as long as the metal housing 27, and even better if it is at least three times as long as the metal housing 27. Thus, the PTC heating elements arranged in the metal housing 27 can release their thermal energy in a lower area of the tank and, in such a manner, melt early on any ice at the mouth of the intake pipe 20. The frame 30 bears the intake pipe 20 and the electric supply leads 50, 51. It extends from the liquid that is intended to be in the tank.

The electric supply leads 50, 51 are arranged in grooves 52, 53 of the frame 30 (FIG. 12), by means of which they are fastened and positioned while being assembled. It is particularly beneficial if at least one of the electric supply leads 50, 51 preferably, however, both electric supply leads 50, 51, extend along the back of the intake pipe 20 so that the intake pipe can be heated by the supply leads. For this it is beneficial to make at least a section of one but preferably of both supply leads out of a heat conducting alloy, so that during operation a heating by an ohmic resistance heating takes place.

The frame 30, illustrated in FIG. 12, is an assembly frame that bears the disk-shaped PTC heating elements of the heating insert. For this, the frame 30 is provided with two supports 54 into which disk-shaped PTC heating elements are to be inserted. The frame 30 is also provided with two connection plates 55, 56 each of which, according to FIG. 11, is affixed to one of the two supply leads 50, 51, preferably by welding, constituting a contact with the PTC heating elements inserted in the recesses 54. After insertion of the disk-shaped PTC heating elements, the supports 54 of the frame 30 are drawer-like pushed into suitable rectangular openings of the metal housing 27.

The housing 27 is an extruded section which, after the supports 54 were pushed in, is compressed in the area of the PTC elements in order to obtain a good thermal coupling of the housing with the PTC heating elements. At that time, an electric contact of the metal housing 27 with the shunted to ground contact plate 56 is established, so that a connection to ground is given for both PTC elements.

As in the above described embodiments, the metal housing 27 consists of an aluminum alloy and has heating channels 35 into which the frame 30 with the PTC heating elements is pushed. The heat generated by the heating elements is released by means of heat release surfaces 45 which, in the illustrated embodiment, are configured as ribs.

Figure 14:
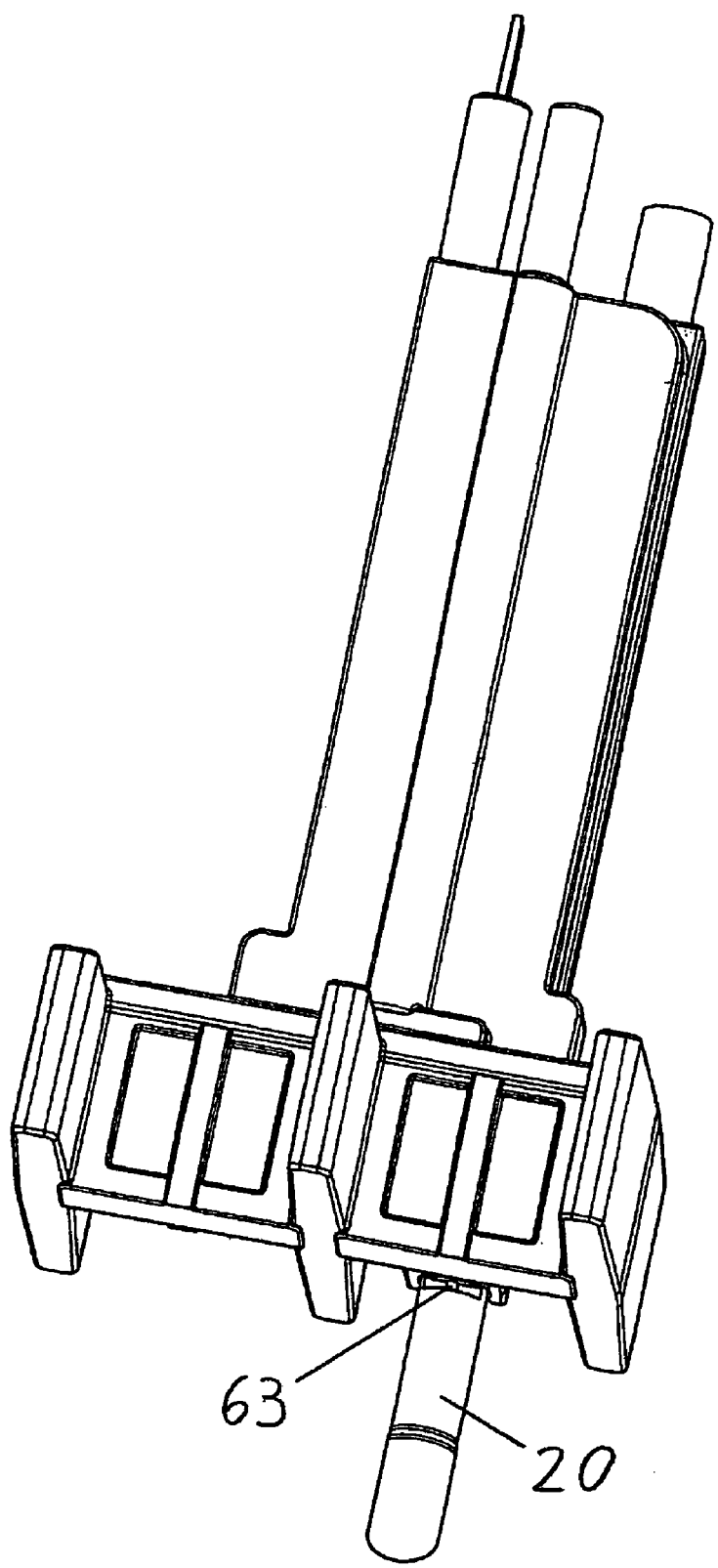
FIG. 14 is a rear view of FIG. 10.

As illustrated in FIG. 10, the intake pipe 20 protrudes with its suction end from the metal housing 27 and with its connecting end from the frame 30. The intake pipe 20 is provided with two separate channels 60, 61. One of the two channels, preferably the smaller channel 61, is occluded at the suction end of the intake pipe 20 with, e.g., an inserted high-grade steel pin. In case the illustrated heating insert 8 is arranged in a urea tank 3, the intake pipe 20 protrudes with its suction end through a (not shown) opening of the defrosting vessel 9 into the urea tank 3. As shown in FIG. 14, on one surface of the intake pipe 20 is provided a second inlet opening 63 through which the fluid can be suctioned into the second channel 61. The second inlet opening 63 is at a distance of at least 1 centimeter, but preferably at several centimeters, from the suction end of the intake pipe 20. When the heating insert 8 is arranged in a defrosting vessel 9, fluid can be suctioned through the second inlet opening 63 from the defrosting vessel and through the first intake opening of channel 60 from a urea tank 3. Should the fluid in the urea tank 3 be frozen, fluid is automatically conveyed in such manner from the defrosting vessel 3.

Thus, by adapting the cross-section ratios of the two channels 60, 61 of the intake pipe 20, a defined flow relation to the urea conveyance can be established in a very simple manner.

REFERENCE NUMBERS LIST

1 Waste gas cleaning catalyst
2 Urea supply system
3 Urea tank
4 Return line
5 Pump
6 Connection line
7 second connection of the connection line
8 Heating insert
9 Defrosting vessel
10 Control valve
11 Connection line
12 Air supply
13 Compressor
14 Dosing valve
15 Control unit
16 Probe
17 first connection of the connection line
18 Reversing valve
19 Vent hole
20 Intake pipe
21 Plastic sheath
22 Junction lines
23 Distribution element
24 Openings
25 Heat-conducting element
26 Openings
27 Metal housing
27a Wall of the metal housing
28 Heating elements
29 Overflow opening
30 Assembly frame
31 Joint plates
32 Groove
33 O-ring
34 Clamping lugs
35 Channel for the insertion of the assembly frame
36 Channel for the insertion of the intake pipe
37 Bumps
38 Opening of the bumps
39 Press folds
40 Pipe sections of the metal housing
41 Pipe
42 Bracket of the metal housing
43 Central body of the metal housing
44 Central channel
45 Heat emission surfaces
50 Electric supply lead
51 Electric supply lead
52 Groove for electric supply lead 50
53 Groove for electric supply lead 51
54 Recess for PTC heating element
60 Channel for the intake pipe 20
61 Channel for the intake pipe 20
63 Lateral suction opening to the intake pipe 20

What is claimed is:

1. A urea supply system for a waste gas cleaning catalyst of an internal combustion engine, comprising:
a urea tank for storing of urea solution;
a connection line that connects the urea tank with a waste gas cleaning catalyst;
a pump to pump urea solution via the connection line from the urea tank to the catalyst;
a heating insert for the defrosting of frozen urea solution, the heating insert comprising at least one PTC-heating element arranged in a metal housing and a plastic casing surrounding the metal housing
a return line that branches off the connection line and extends to the urea tank, said return line being configured and arranged in such a manner that, during operation, the urea solution discharging from the return line prevents forming an air gap between the heating insert and the frozen urea solution to be defrosted; and
a defrosting vessel disposed in the urea tank, the connecting line being connected to the defrosting vessel in which a portion of the frozen urea solution in the system can be defrosted by means of the single heating insert, the portion sufficing for starting of the catalyst, and wherein the return line leads to the defrosting vessel, the defrosting vessel further including an overflow opening through which urea solution can flow from the defrosting vessel into the surrounding urea tank.

2. The urea supply system according to claim 1, further comprising a distribution element is provided at an outlet of the return line to distribute the urea flow discharged from the return line.

3. The urea supply system according to claim 1, wherein the return line is configured and arranged in such a manner that during operation urea is directly conveyed to the heating insert in order to fill a possible gap between the heating insert and frozen urea solution.

4. The urea supply system according to claim 1, wherein the heating insert is provided with an intake pipe that is connected to the connecting line.

5. The urea supply system according to claim 1, wherein the return line has several outlets through which urea is returned during operation.

6. The urea supply system according to claim 1, wherein the return line is provided with a vent hole.

\* \* \* \* \*